United States Patent [19]

Looney et al.

[11] Patent Number: 5,339,694
[45] Date of Patent: Aug. 23, 1994

[54] MONITORING PROBE FOR GROUNDWATER FLOW

[75] Inventors: Brian B. Looney, Aiken, S.C.; Sanford Ballard, Albuquerque, N. Mex.

[73] Assignee: The United States of America as represented by the United States Department of Energy, Washington, D.C.

[21] Appl. No.: 66,236

[22] Filed: May 25, 1993

[51] Int. Cl.$^5$ ............................................... G01F 1/56
[52] U.S. Cl. ......................... 73/861.07; 73/861.08; 73/170.11
[58] Field of Search ............... 166/250, 66; 73/170.11, 73/861.07, 861.08, 195

[56] References Cited

U.S. PATENT DOCUMENTS

| | | | |
|---|---|---|---|
| 3,722,276 | 3/1973 | Chandler et al. | 73/861.07 |
| 4,166,215 | 8/1979 | Anderson | 250/260 |
| 4,391,137 | 7/1983 | Kerfoot et al. | 73/204 |
| 4,570,492 | 2/1986 | Walsh | 73/861.05 |
| 4,702,801 | 10/1987 | Gyokhegyi | 73/861.07 |
| 4,963,019 | 10/1990 | Foster et al. | 356/28 |

Primary Examiner—Richard E. Chilcot, Jr.
Assistant Examiner—Harshad Patel
Attorney, Agent, or Firm—Brian R. Tumm; Harold M. Dixon; William R. Moser

[57] ABSTRACT

A monitoring probe for detecting groundwater migration. The monitor features a cylinder made of a permeable membrane carrying an array of electrical conductivity sensors on its outer surface. The cylinder is filled with a fluid that has a conductivity different than the groundwater. The probe is placed in the ground at an area of interest to be monitored. The fluid, typically saltwater, diffuses through the permeable membrane into the groundwater. The flow of groundwater passing around the permeable membrane walls of the cylinder carries the conductive fluid in the same general direction and distorts the conductivity field measured by the sensors. The degree of distortion from top to bottom and around the probe is precisely related to the vertical and horizontal flow rates, respectively. The electrical conductivities measured by the sensors about the outer surface of the probe are analyzed to determine the rate and direction of the groundwater flow.

12 Claims, 2 Drawing Sheets

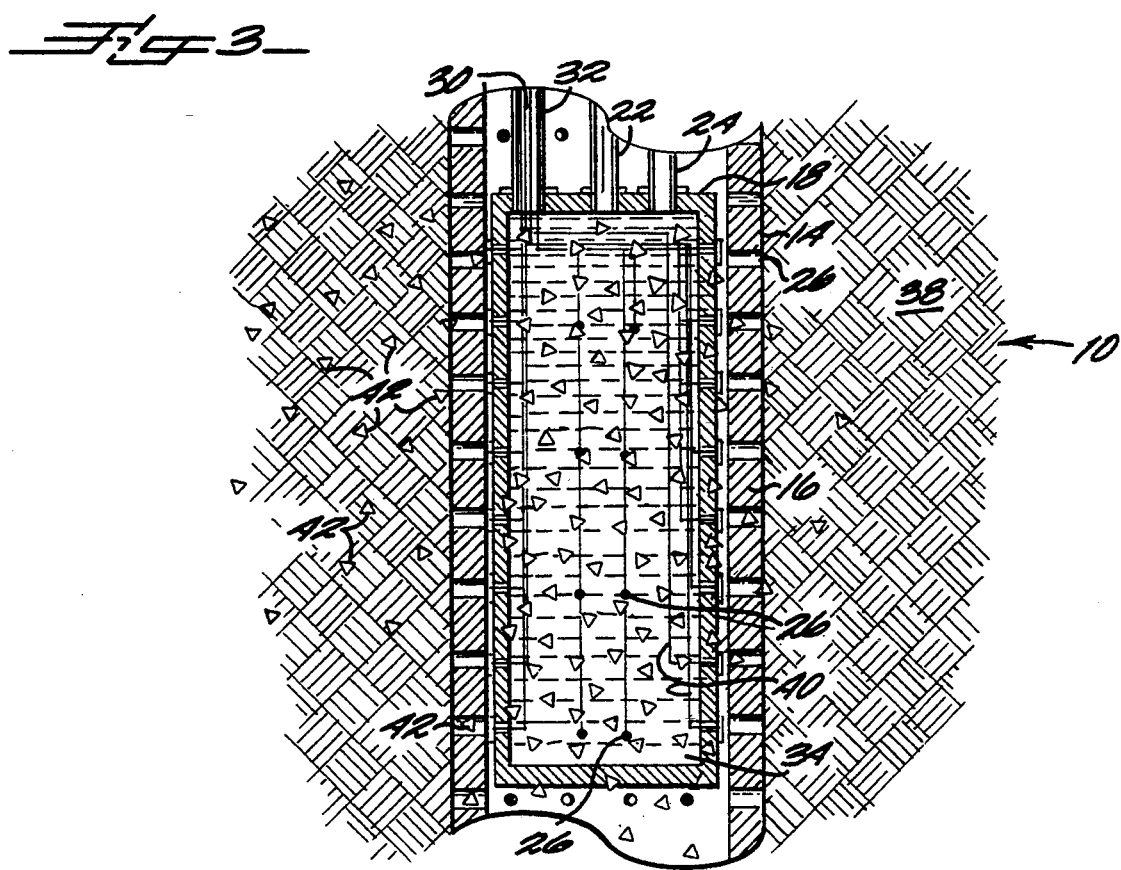

MONITORING PROBE FOR GROUNDWATER FLOW

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to flow monitoring devices. More particularly, the present invention relates to probes for monitoring the flow of groundwater. The United States Government has rights in this invention pursuant to Contract No. DE-AC09-89SR18035 between the U.S. Department of Energy and Westinghouse Savannah River Company.

2. Discussion of Background

Many devices that measure the flow of liquids are known to exist. Moreover, existing devices are known that measure specifically the magnitude and direction of groundwater flow beneath the earth's surface. Similarly, devices that measure fluid flow in other media are also known.

For example, Walsh, in U.S. Pat. No. 4,570,492, describes a flowmeter that measures liquid flow by electrochemical emission and detection. The flowmeter is specifically useful as a speed indicator for nautical vessels, and the like. The device has an upstream source that periodically discharges a known chemical into the liquid flow. A downstream probe detects the arrival of the chemical and communicates the information to an electronic circuit for determining the liquid flow rate.

For groundwater flow, Foster et al (U.S. Pat. No. 4,963,019) disclose a device that uses light refraction for detecting flow. Light from a light source passes through groundwater to a photodigitizer. Light refracted by suspended particulate is correlated with the direction of flow of the groundwater.

Kerfoot et al, in U.S. Pat. No. 4,391,137, disclose a groundwater flow detector using thermal differentials as a basis for detecting flow. The device operates by transferring a known quantity of heat across a porous, heat conductive medium along with the flowing groundwater. A series of temperature sensors near the medium detects the temperature differentials, which are then mapped and used in determining the groundwater flow rate.

Dunn et al, in U.S. Pat. No. 4,547,080, disclose a groundwater flow sensor that uses a thermal perturbation technique to determine the groundwater flow velocity in the immediate vicinity of the probe. The device consists of a long thin cylinder with a heater and an array of temperature sensors on its surface. The heater warms the ground and the groundwater surrounding the device. In the presence of a flow field past the probe the temperature distribution on the surface of the device is perturbed as heat emanating from the probe is advected around the device. Relatively cool temperatures occur on the upstream side of the cylinder and relatively warm temperatures occur on the downstream side. In this manner, Dunn et al employ the diffusion of heat from the probe and measure the temperature distribution on the surface of the probe.

It is believed that no flow monitoring device diffuses an electrolyte from the surface of the device and uses the measurement of the distribution of electrical conductivity on the surface of the device as a means for detecting the magnitude and direction of such flow.

SUMMARY OF THE INVENTION

According to its major aspects and broadly stated, the present invention is a fluid flow monitoring device. In particular, it is a monitoring probe for detecting groundwater migration. A cylindrical container made of a permeable membrane, having an array or otherwise patterned sequence of electrical conductivity sensors affixed to its outer surface, is supplied with a fluid that has a solution electrical conductivity different than the groundwater and placed in an area of interest. The fluid, typically "saltwater", diffuses through the permeable membrane into the surrounding formation, which contains flowing groundwater. The flow of groundwater around the cylinder moves the conductive ions and distorts the conductivity field in the immediate vicinity of the cylinder, which is measured by the sensors. The degree of distortion around the cylinder and from top to bottom is precisely related to the vertical and horizontal groundwater flow rates. The sensors on the outer surface of the probe are analyzed by an externally located analysis device to determine the rate and direction of the groundwater flow.

An important feature of the present invention is the array of conductivity sensors. The sensors are affixed to the permeable cylinder in an array or pattern so that conductivity measurements on the surface of the cylinder can be made simultaneously. The pattern is designed to allow measurement of flow in all directions with respect to the axis of the cylindrical membrane, thus enabling a more precise determination of groundwater flow using a single monitoring device, rather than multiple water level measurements.

Another feature of the present invention is the permeable membrane. The advantage of this feature is twofold. First, the membrane, which is permeable to the conductive fluid, provides an initial container for the conductive fluid to be stored before it is gradually released at a constant rate into the groundwater area to be monitored. Second, the membrane provides a support structure for carrying the array of sensors and positioning them in the immediate groundwater area of interest.

Still another advantage of the present invention is the measurement of electrical conductivity, rather than another physical characteristic, to determine groundwater flow. The advantage of this feature is convenience, as electrical conductivity sensors are easier to maintain and operate than, say, heat transfer sensors, which require the presence of a continuous heat source. Such a requirement for groundwater flow monitors has proven difficult and cumbersome in the past. Furthermore, electrical conductivity sensors are relatively inexpensive and generally more reliable than other types of measurement sensors.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a cross-sectional view of the monitoring probe of FIG. 1 in operation during moderate groundwater flow from right to left direction.

DETAILED DESCRIPTION OF A PREFERRED EMBODIMENT

Figure 1:
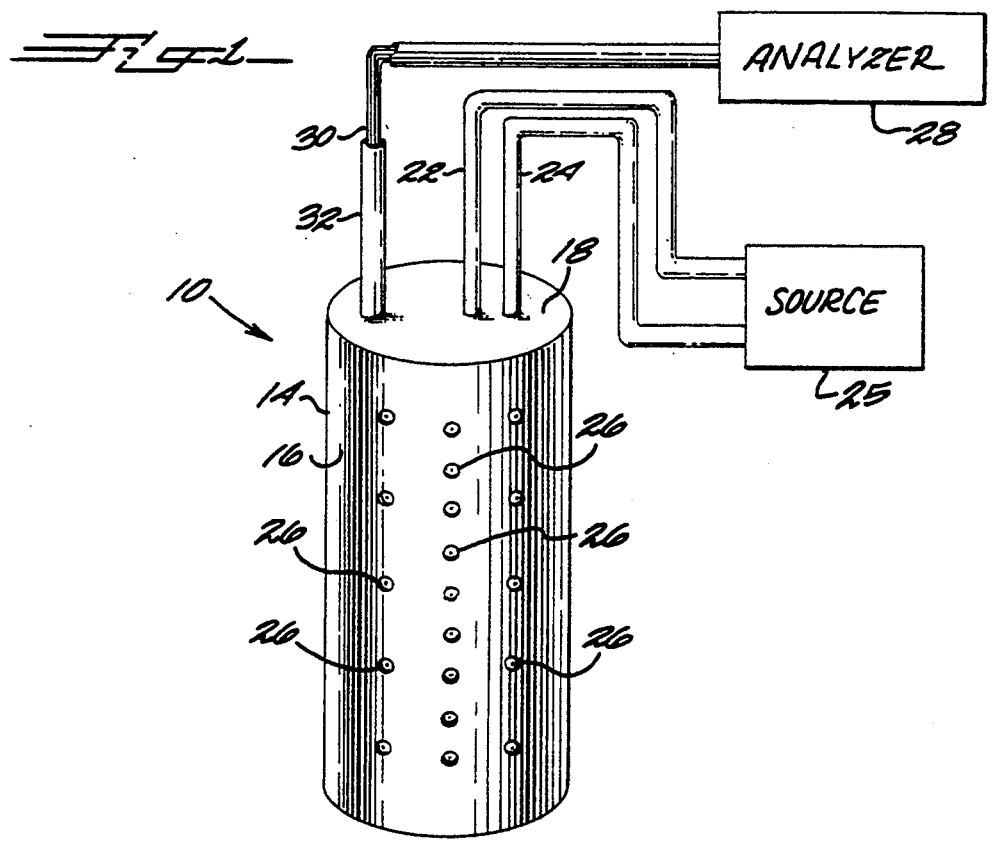
FIG. 1 is a perspective view and partial schematic of a groundwater flow monitoring probe according to a preferred embodiment of the present invention.

In the following description similar components are referred to by the same reference numeral in order to simplify the understanding of the drawings.

Referring now to FIG. 1, the monitoring probe 10 in its preferred embodiment is a long, slender cylinder 14 of finite length made of a membrane 16. Membrane 16 should be of the kind that is permeable at least to the conductive fluid that is to be used, "saltwater". Cylinder 14 is enclosed by a top cover 18 and may optionally be equipped with pipes 22, 24 for supplying or refilling the interior of cylinder 14 with saltwater from a source 25 of saltwater. Also, cylinder 14 has a patterned series or array of sensors 26 affixed to the outer surface of membrane 16. Sensors 26 are in electrical communication with an analyzer 28 through a series of wires 30 fed to the interior of cylinder 14 through an electrical wiring conduit 32.

In FIG. 3, the interior 34 of cylinder 14 is shown during typical operation of probe 10. It can be seen that conductivity sensors 26 are embedded in membrane 16 and extend from interior 34 through membrane 16 to an area of monitoring interest 38, such as a groundwater location beneath the earth's surface. Each sensor 26 has a wire 40 attached to it that is fed through electrical wiring conduit 32 to establish electrical communication between sensors 26 and analyzer 28.

Pipes 22, 24 are used to feed saltwater or an other conductive fluid, generally depicted by symbols 42, into interior 34 of probe 10. Also, pipes 22, 24 can be used to extract conductive fluid 42 from probe 10 if, say, monitoring operations have been completed or a different conductive fluid 42 is to be used. Pipes 22, 24 are connected to source 25 of saltwater or other conductive fluid 42 to be used.

In use, probe 10 is positioned in the area of monitoring interest 38. Probe 10 can be physically inserted into area 38, or it may be placed within a borehole through area 38 and then backfilled with the previously extracted material from area 38 caused by the borehole. Because of the presence of pipes 22, 24, probe 10 can be filled with conductive fluid 42 either prior to or after the insertion of probe 10 into area 38.

Once probe 10 is positioned within area 38, sensors 26 are activated to monitor conductivity. Each sensor 26 produces an output signal based on the conductivity of area 38 within the sensor's immediate vicinity. That is, conductivity measurements taken from all sensors 26 will map out the conductive nature of area 38 along the entire outer surface of probe 10.

Upon the initial entry of probe 10 into area 38, a concentration gradient across the walls of probe 10, caused by conductive fluid 42 contained in probe 10, results in a slight, but constant, flux of conductive fluid 42 into area 38. Thereafter, subsequent movement of conductive fluid 42 through area 38 is caused by the diffusion of conductive fluid 42 through area 38 and by the flow rate and direction of groundwater in area 38. Thus, conductive fluid 42 will tend to move in the direction of the groundwater migration, and at a similar flow rate.

For example, in FIG. 3, cylinder 14 is vertically buried in region 38 of permeable material where the general flow of groundwater is from the lower right region of area 38 toward the upper left region of area 38. A portion of conductive fluid 42 emanating from the lower right portion of membrane 16 is transported around the exterior of cylinder 14 by the flowing groundwater, resulting in a higher concentration of conductive fluid 42 adjacent to the upper left portion of membrane 16 (the downstream side of probe 10) relative to the lower right portion of membrane 16 (the upstream side of probe 10). Since the electrical conductivity of region 38 is directly related to the concentration of conductive fluid 42 contained in region 38, sensors 26 located on the upper left portion of cylinder 14 (the downstream side of probe 10) will measure relatively high electrical conductivity while sensors 26 on the lower right portion of cylinder 14 (the upstream side of probe 10) will measure relatively low electrical conductivity.

Figure 2A:
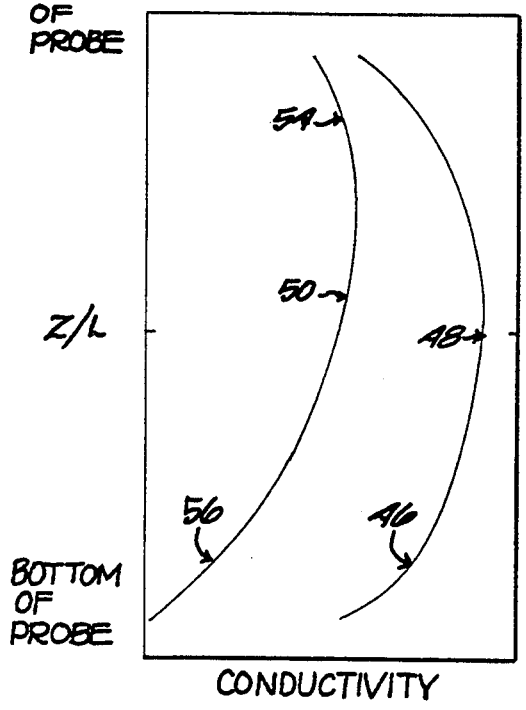
FIG. 2a is a graph of relative conductivity measurements of typical groundwater flow made by a monitoring probe according to a preferred embodiment of the present invention.
Figure 2B:
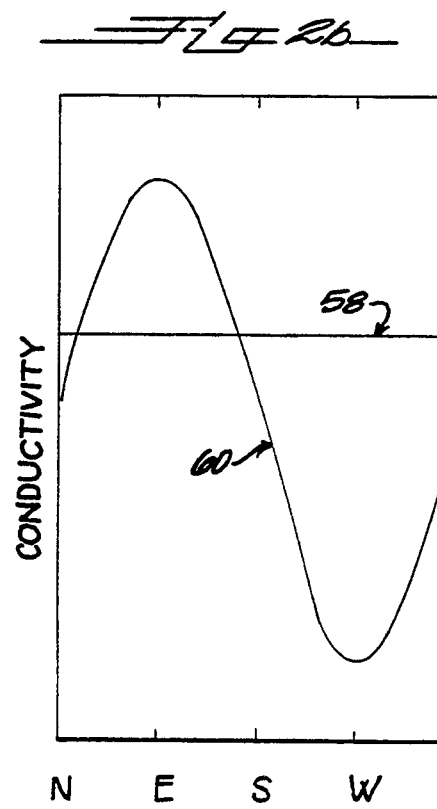
FIG. 2b is a graph of the distribution of electrical conductivity around the circumference of a monitoring probe for two different groundwater flow scenarios according to a preferred embodiment of the present invention.

In practice, sensors 26 will be monitored and from the data they yield, the distribution of electrical conductivity on the surface of probe 10 will be determined. From this distribution, the magnitude and direction of the three dimensional groundwater flow velocity vector can be uniquely determined. In FIGS. 2a–b, the electrical conductivity distributions that result from several different possible flow velocities are illustrated.

In FIG. 2a, a vertical electrical conductivity profile of area 38, under two different groundwater flow scenarios, is shown. First, curve 46 shows a conductivity profile, relative to the size of cylinder 14, for area 38 having relatively little groundwater flow in the vertical direction. Notice that for little or no groundwater flow, the curve is similar in conductivity level at both the upper portion of the graph (representing the upper portion of probe 10) and the lower portion of the graph, while a middle segment 48 of curve 46 shows an increased conductivity level. This relative increase in conductivity is due to the fact that diffusion of conductive fluid 42 away from the ends of a long, thin finite length cylinder is more efficient than diffusion away from the mid-section of the same cylinder.

Curve 50 shows a conductivity profile for area 38 having a flow of groundwater that has a significantly upwardly directed vertical component. The average conductivity on the surface of probe 10 is lower in this case than in the case of no groundwater flow, which is illustrated by curve 46, because some of conductive fluid 42 emanating from permeable membrane 16 is transported away from the vicinity of probe 10 by the flowing groundwater. In addition, the vertical conductivity distribution on the surface of probe 10 illustrated by curve 50 is skewed in the direction of the groundwater flow. The conductivity of an upper portion 54 of curve 50 exhibits greater conductivity than a lower portion 56 of curve 50 because some of conductive fluid 42 is transported vertically upward from the lower portion of probe 10 to the upper portion of probe 10.

In FIG. 2b, the distribution of electrical conductivity around the circumference of probe 10 is illustrated for two different groundwater flow scenarios. Curve 58 indicates that when there is no flow of groundwater past probe 10, or when the flow past probe 10 has no horizontal component, the electrical conductivity measured on the surface of probe 10 is independent of azimuth, i.e., the conductivity is uniform all around probe 10. Curve 60 illustrates the relative electrical conductivity, as a function of azimuth, for the case where the groundwater flow in area 38 has a significant horizontal component, which is directed from west to east. The conductivity on the west (upstream) side of probe 10 is relatively low compared to the conductivity on the east (downstream) side of probe 10. This results from the fact that some of conductive fluid 42 emanating from permeable membrane 16 on the west (upstream) side of probe 10 is transported around probe 10 to the east (downstream) side of probe 10, thereby lowering the concentration of conductive fluid 42 on the west (upstream) side of probe 10 and increasing the concentration of conductive fluid 42 on the east (downstream) side of probe 10.

By combining the analyses for the vertical and horizontal components of groundwater flow as described above, the three full dimensional groundwater flow velocity vector can be resolved.

It will be apparent to those skilled in the art that many changes and substitutions can be made to the preferred embodiment herein described without departing from the spirit and scope of the present invention as defined by the appended claims.

What is claimed is:

1. Apparatus for monitoring the flow rate of groundwater, said apparatus for use with a fluid having an electrical conductivity different from that of said groundwater, said apparatus comprising:
    means for releasing said fluid into said groundwater, said releasing means permeable to said fluid and having a first side and a second side, said fluid on said first side and said groundwater on said second side, said fluid permeating through said releasing means from said first side to said second side to form a mixture with said groundwater, said mixture having a mixture electrical conductivity, said mixture electrical conductivity being related to the relative concentration of said groundwater in said mixture, said concentration of said groundwater in said mixture being related to said rate of flow of groundwater proximate to said releasing means and related to the rate of said fluid permeating through said releasing means from said first side to said second side; and
    means for measuring said mixture electrical conductivity, said measuring means carried by said releasing means.

2. The apparatus as recited in claim 1, wherein said measuring means further comprises a plurality of sensors spaced apart from each other, each of said sensors measuring electrical conductivity of said mixture at a different location near said second side of said releasing means and producing an output signal related thereto.

3. The apparatus as recited in claim 1, wherein said measuring means further comprises an array of sensors spaced apart from each other, each sensor of said array of sensors measuring electrical conductivity of said mixture at a different location near said second side of said releasing means and producing an output signal related thereto.

4. The apparatus as recited in claim 1, wherein said releasing means further comprises a membrane adapted to hold a quantity of said fluid, said membrane having an interior defined by said first side and an outside defined by said second side.

5. The apparatus as recited in claim 1, wherein said measuring means further comprises an array of sensors spaced apart from each other, each sensor of said array of sensors measuring electrical conductivity of said mixture at a different location near said second side of said releasing means and producing an output signal related thereto, said electrical conductivity of said mixture related to said groundwater flow at said different location of each of said array of sensors, and said apparatus further comprising means for analyzing said output signals from said array of sensors, said analyzing means in electrical communication with each sensor of said array of sensors and determining said flow of groundwater based on said location of each of said sensors of said array of said sensors and said electrical conductivity at said location.

6. The apparatus as recited in claim 1, further comprising means for supplying said fluid to said first side of said releasing means, said supplying means in fluid communication with said first side of said releasing means.

7. Apparatus for use in the ground for monitoring the flow rate and direction of groundwater, said apparatus for use with an electrical fluid having a electrical conductivity different from that of said groundwater, said apparatus comprising:
    a cylindrical membrane adapted to hold a quantity of said fluid, said membrane permeable to said fluid and having a first side and a second side, said fluid on said first side and said groundwater on said second side, said fluid permeating through said membrane from said first side to said second side to form a mixture with said groundwater, said mixture having a mixture electrical conductivity, said mixture electrical conductivity being related to the relative concentration of said groundwater in said mixture, said concentration of said groundwater in said mixture being related to said rate of flow of groundwater proximate to said membrane; and
    an array of sensors carried by said membrane and spaced apart from each other, each sensor of said array of measuring electrical conductivity of said mixture at a different location near said second side of said membrane and producing an output signal related thereto, said electrical conductivity of said mixture related to said groundwater flow at said different location of each of said array of sensors.

8. The apparatus as recited in claim 7, further comprising means for analyzing said output signals from said array of sensors, said analyzing means in electrical communication with each sensor of said array of sensors and determining said flow of groundwater based on said location of each of said sensors of said array of said sensors and said electrical conductivity at said location.

9. The apparatus as recited in claim 7, further comprising means for supplying said fluid to said first side of said membrane, said supplying means in fluid communication with said first side of said cylindrical membrane.

10. A method for monitoring the flow rate and direction of groundwater, said method for use with a fluid having an electrical conductivity different than that of said groundwater, said method comprising the steps of:
    placing said fluid on a first side of a membrane permeable to said fluid so that said fluid permeates from said first side through said membrane to an opposing second side;

placing said membrane into the ground where groundwater is present on said second side of said membrane whereby said fluid permeates through said membrane from said first side to said second side and into said groundwater at a known rate and location, said fluid forming a mixture with said groundwater, said mixture having a mixture electrical conductivity, related to the relative concentration of said groundwater in said mixture, said concentration of said groundwater in said mixture being related to said rate of flow of groundwater proximate to said location and available for mixing said fluid.

11. The method as recited in claim 10, further comprising the step of:

placing said fluid on a first side of a membrane permeable to said fluid so that said fluid permeates from said first side through said membrane to an opposing second side;

placing said membrane into the ground where groundwater is present on said second side of said membrane whereby said fluid permeates through said membrane from said first side to said second side and into said groundwater forming said mixture; and supplying said first side of said membrane with said fluid.

12. The method as recited in claim 10, further comprising the steps of:

mapping said output signals from each sensor of said array of sensors with an analyzer, said analyzer in electrical communication with each sensor of said array of sensors, and determining the flow of said groundwater with said analyzer from said mapping step, said flow of groundwater based on said location of each of said sensors of said array of said sensors and said electrical conductivity at said location.

* * * * *